United States Patent [19]
Henry et al.

[11] Patent Number: 5,887,097
[45] Date of Patent: Mar. 23, 1999

[54] APPARATUS FOR PUMPING AN OPTICAL FIBER LASER

[75] Inventors: Charles Howard Henry, Skillman, N.J.; Daryl Inniss, Alpharetta, Ga.; Edward John Laskowski, Scotch Plains, N.J.; Michele Ann Milbrodt, Macungie, Pa.

[73] Assignee: Lucent Technologies Inc., Murray Hill, N.J.

[21] Appl. No.: 897,274

[22] Filed: Jul. 21, 1997

[51] Int. Cl.⁶ ....................................................... G02B 6/26
[52] U.S. Cl. ................................... 385/39; 385/123; 372/6
[58] Field of Search ............................. 385/39, 123–127, 385/141, 142; 372/6, 68

[56] References Cited

U.S. PATENT DOCUMENTS

| | | | |
|---|---|---|---|
| 4,818,062 | 4/1989 | Scifres et al. | 385/142 X |
| 5,185,758 | 2/1993 | Fan et al. | 372/72 |
| 5,268,978 | 12/1993 | Po et al. | 385/34 X |
| 5,708,669 | 1/1998 | DiGiovanni et al. | 385/142 X |

*Primary Examiner*—Phan T. H. Palmer
*Attorney, Agent, or Firm*—Mathews, Collins, Sheperd & Gould, P.A.

[57] ABSTRACT

In accordance with the invention, arrays optical sources are combined in a multilevel planar optical waveguide structure for insertion into an optical fiber laser. The basic element of the combiner is a planar array of multiple waveguides which converge and are gradually tapered to a single output waveguide. A plurality of such elements integrally formed on successive cladding layers provides a high power stack of vertically aligned outputs. An arrangement is described for using such apparatus in the amplification of optical communications signals.

9 Claims, 3 Drawing Sheets

APPARATUS FOR PUMPING AN OPTICAL FIBER LASER

FIELD OF THE INVENTION

This invention relates to apparatus for pumping optical fiber lasers and, in particular, to a device for coupling light from a multiplicity of sources into such lasers. The apparatus is particularly useful for amplifying optical communications signals.

BACKGROUND OF THE INVENTION

A typical optical communications system comprises a source of optical input signals, a network of optical waveguides coupled to the source, one or more optical amplifying devices along the waveguides and one or more optical receivers.

The waveguides are typically optical fibers—small diameter circular waveguides characterized by a core with a first index of refraction surrounded by a cladding having a second (lower) index of refraction. Typical telecommunications fibers are made of high purity silica with minor concentrations of dopants to control the indices of refraction. They can transmit an optical signal containing a large amount of information.

For long distance applications, such as undersea cable and many terrestrial applications, it is necessary to periodically amplify the transmitted signal as by passage through a rare-earth doped fiber amplifier. Such amplifiers typically comprise a short (typically 30 m) length of optical fiber doped with a small percentage of rare earth elements such as Er. After these fibers are exposed to light of an appropriate pump wavelength (shorter than the transmitted wavelength) they are capable of stimulated emission at the signal wavelength. Typical communications systems utilize signal wavelengths of about 1550 nm and Er fiber amplifiers pumped at 980 or 1440 nm.

Amplifying arrangements with compact, efficient pumping are currently a problem in optical communications. In general, the higher the level of pumping power, the greater the amplification. Raman amplification, for example, requires much more pump power than can be supplied by single semiconductor laser pumps. Arrays of pumps are used to supply adequate pump power. Anticipated applications seek as much pumping power as can be compactly generated and efficiently injected into the amplifier cores. The conventional pumping sources are arrays of semiconductor laser diodes. But the output of each diode is limited and it is difficult to combine the outputs of numerous diodes for efficient injection into the tiny core of an amplifying fiber.

U.S. Pat. No. 5,268,978 describes an apparatus for combining the outputs of numerous diodes. In essence, a plurality of fibers have one set of ends horizontally aligned along a cylindrical lens in registration with the diodes and the other ends are vertically stacked and focused onto a fiber laser having a large core. The difficulty with this approach for communications applications is that precise assembly and alignment of the numerous small components used in this apparatus would be prohibitively expensive and time-consuming. Moreover the large core multimode lasers thus produced are unduly large for communications applications.

Accordingly there is a need for an improved apparatus for pumping an optical fiber laser.

SUMMARY OF THE INVENTION

In accordance with the invention, the energy of arrays optical sources are combined in a multilevel planar optical waveguide structure for insertion into an optical fiber laser. The basic element of the combiner is a planar array of multiple waveguides which converge and are gradually tapered to a single output waveguide. A plurality of such elements integrally formed on successive cladding layers provides a high power stack of vertically aligned outputs. An arrangement is described for using such apparatus in the amplification of optical communications signals.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1A:
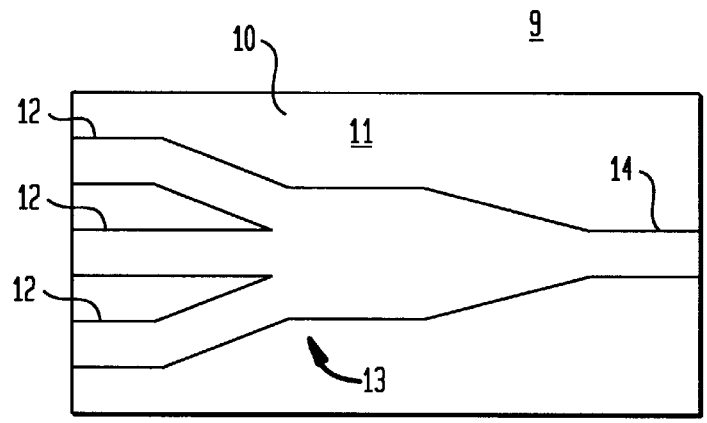
FIGS. 1A, 1B and 1C are top plan and opposing end views of a combining element for coupling light from an array of sources into an optical laser.

Referring to the drawings, FIG. 1A is a top plan view of a combining element useful as a component in the preferred optical combiner. In essence, the combining element 9 comprises a substrate 10 including a planar optical waveguide structure 11 configured in a pattern wherein a plurality of input waveguides 12 (here three) join together in an intermediate convergence region 13. The convergence region, in turn, tapers to a single output waveguide 14. If the taper is gradual (in excess of 10 wavelengths of the transmitted light), a substantial portion of the light from each input waveguide will be present in the output. Thus light from an array of light sources (not shown) inserted in input waveguides 12 is combined at output 14.

Figure 1B:
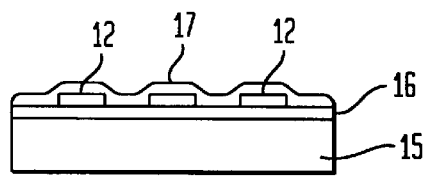

As better shown in FIG. 1B, the substrate 10 can be a chip of monocrystalline silicon 15 having a silicon oxide base layer 16. The cores forming input waveguides 12 can be phosphorous-doped silica, and the cores are covered with a layer of silica or phosphorus and boron-doped silica to act as a top cladding 17. The base layer typically has a thickness in the range 10–20 micrometers. The core layer has a thickness in the range 1–8 micrometers, and the cladding thickness is typically 7–20 micrometers. The substrate 10 can alternatively be fused silica.

Figure 1C:
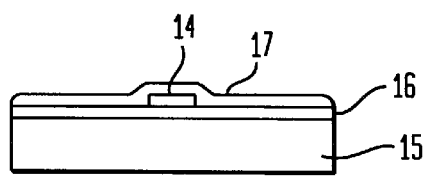

For combining light from semiconductor light emitting diodes, the input cores can have typical thickness of 1 micrometer and a width of 100 micrometers. The convergence region can initially have a width approximating the sum of the widths of the input waveguides, e.g. 300 micrometers, and it tapers to an output width (14 of FIG. 1C) approximating that of the inner cladding of the fiber to be pumped. Accompanying the tapering is an increase in angular spread of the light that may not exceed the output waveguide acceptance angle (specified by the numerical aperture).

The structure is advantageously fabricated as described in C. H. Henry et al., "Glass Waveguides on Silicon for Hybrid Optical Packaging", 7 *J. Lightwave Techn.*, pp. 1530–1539 (1989). In essence, silicon substrate 15 is provided with base layer 16 grown by high pressure steam oxidation. The core layer can be deposited on the oxide using LPCVD and can be etched as by RIE to the desired waveguide configuration. The core glass is then annealed, and the cladding glass is deposited on top.

The FIG. 1 combining element, for concrete illustration, uses three input waveguides. Clearly the number of input waveguides can be larger or smaller. A larger number of input waveguides would require longer lengths of taper and a larger numerical aperature of the output waveguide to keep losses acceptable.

Figure 2A:
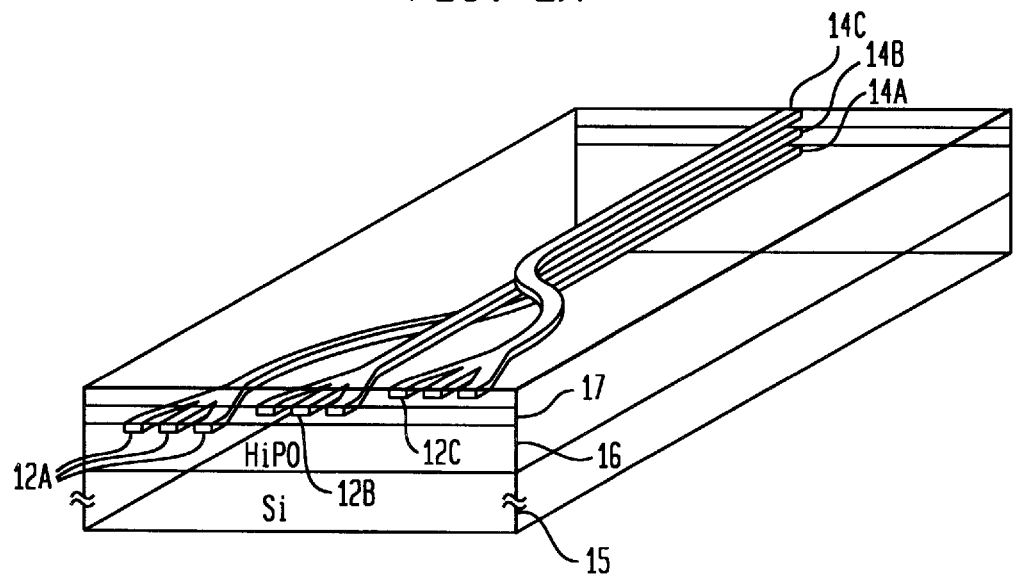
FIG. 2A is a perspective view of a preferred optical combiner.

In accordance with the preferred embodiment of the invention, a plurality of combining elements similar to those shown in FIG. 1 are fabricated in overlying layers, and their outputs are brought into vertical alignment for insertion into an optical fiber laser. Each layer can be defined photolithographically. FIG. 2A is a perspective view of such an optical combiner 19 comprising combining elements on three successive layers. The input waveguide ends 12A, 12B, 12C, are laterally displaced to permit coupling with a plurality of light source arrays and the output waveguide ends 14A, 14B, 14C are vertically aligned for coupling with a single fiber laser.

Figure 2B:
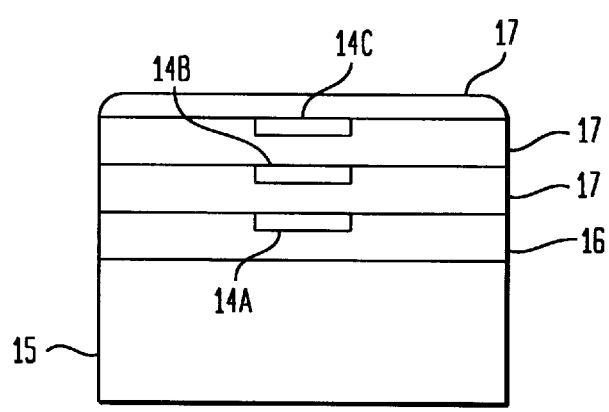
FIG. 2B is an enlarged end view of the combiner of FIG. 2A.

FIG. 2B is an enlarged end view of the device of FIG. 2A showing the vertical alignment of the output waveguide ends 14A, 14B and 14C.

Figure 3:
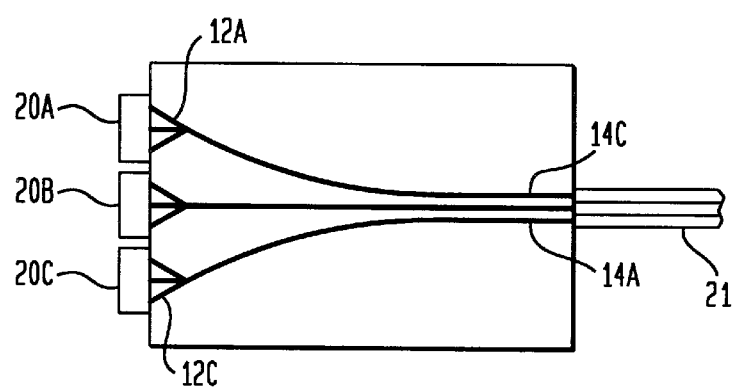
FIG. 3 is a schematic top view of a cladding pumped fiber laser using the combiner of FIG. 2 to couple to plural light sources.

FIG. 3 is a schematic top view of the device of FIG. 2 illustrating how the combiner is coupled to a plurality of optical sources 20A, 20B, and 20C. In typical embodiments, each optical source, e.g. 20A, is a linear array of plural sources such as laser diode arrays. The plural sources in the linear array can be aligned with the plural ends 12A of a respective waveguide. The plural waveguide outputs 14A, 14B, 14C are vertically aligned for coupling light into the fiber laser 21.

The preferred fiber laser is a rare earth doped cladding pumped fiber. If it includes an optical feedback cavity, such as a pair of Bragg reflectors, it becomes an optical oscillator which, in turn, can be used to pump a fiber amplifier.

In order to facilitate coupling with the light sources, the input edge of the substrate can be provided with platforms at appropriate levels so that light source arrays are vertically aligned with the input waveguides. Similarly, the output edge can be provided with a V-groove for aligning the fiber laser 21 with the stack of output waveguides 14A, 14B, 14C.

While this structure can be made using conventional silicon optical bench technology as described in the aforementioned Henry et al. article, it is contemplated that Ge-doped silica (Δ up to 3.5% n) would be preferable for the core material to provide a better match for the laser. It is further contemplated that the waveguide cores could preferably be formed by etching an appropriately dimensioned groove pattern in a planarized base or cladding layer, filling the groove with Ge-doped core glass, planarizing and applying a new core layer.

Figure 4:
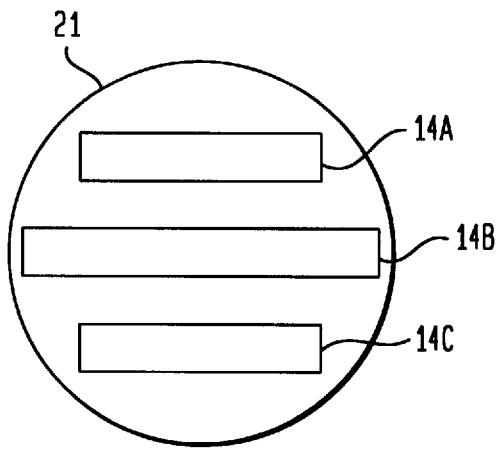
FIG. 4 is an end view of a modified form of the FIG. 2 optical combiner, showing an output stack in relation to an aligned fiber laser.

The waveguide output end 14 is typically of the same width as the waveguide input end 12, but this need not be the case. FIG. 4 illustrates that the widths of successive output waveguides 14A, 14B, 14C can be varied to dimensionally match the laser fiber 21. (For a cladding pumped fiber laser the waveguides ideally match the cross section of the inner cladding.) It should also be clear that more or fewer than three successive layers of combining elements can be employed in the optical combiner. While each waveguide is shown with three aligned ends 12, more or fewer ends can be used.

Figure 5:
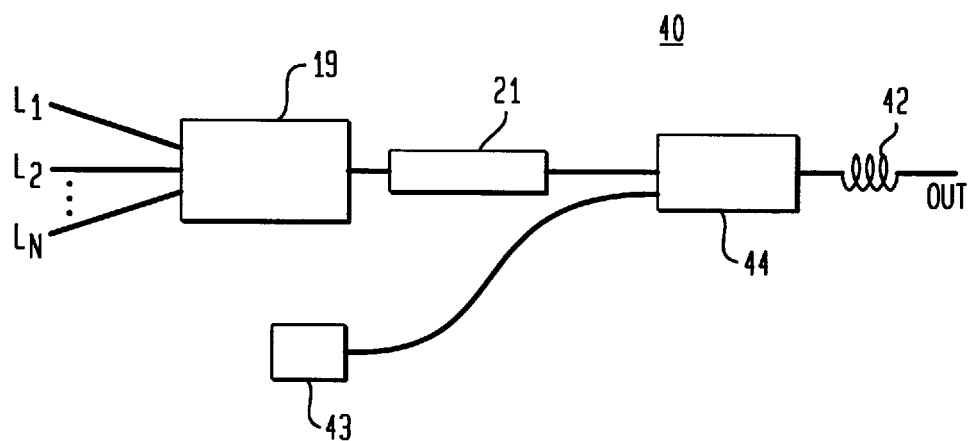
FIG. 5 shows the use of the cladding pumped fiber laser of FIG. 3 to pump a fiber amplifier.

FIG. 5 is a schematic diagram illustrating a preferred use of the FIG. 2 optical combiner in an optical fiber communications system 40. In essence, the combiner 19 is used to combine a plurality of light sources $L_1$, $L_2$, . . . , $L_n$ for pumping the cladding of a fiber laser 21. The cladding pumped fiber laser, in turn, is used to pump the signal amplifier 42. The pump laser power and an optical signal from signal source 43 are combined by multiplexer 44 and propagated through the signal amplifier (typically an Er fiber) to produce an amplified signal output. In typical systems, the signal wavelength is 1550 nm, and the pumping wavelength is 980 or 1440 nm.

Figure 6:
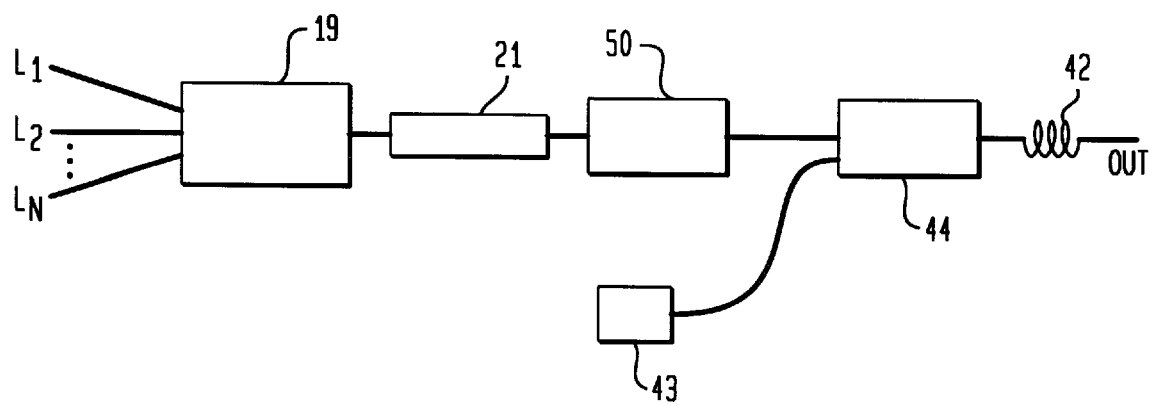
FIG. 6 shows the use of the cladding pumped fiber laser of FIG. 3 to pump a cascaded Raman cavity.

FIG. 6 is an alternative use, similar to that of FIG. 5, wherein the output of the cladding-pumped fiber laser 21 is used to pump a cascaded Raman cavity 50. The output of the Raman cavity, in turn, is used to pump the fiber signal amplifier 42. The signal from source 43 can be combined with the pump power by multiplexer 44. In typical systems, the cladding fiber wavelength is 1060 nm, the Raman cavity output is 1480 nm and the signal wavelength is 1550 nm.

In perspective, it can be seen that the invention is a cladding-pumped optical fiber laser comprising a length of cladding-pumped fiber, a plurality of optical sources for optically pumping the fiber and, optically coupling the optical sources to the fiber, a substrate-supported planar waveguide device comprising a substrate having at least two edges and a plurality of planar waveguides supported on the substrate, each waveguide having at least one first end for coupling to a respective optical source and a second end for coupling to the cladding pumped fiber. The planar waveguides have their respective first ends laterally and vertically spaced apart along a first edge of the substrate and their second ends laterally aligned at a second edge of the substrate.

In specific embodiments, each optical source comprises an array of plural sources and each planar waveguide comprises an array of first ends spaced for coupling to respective sources of a source array. The preferred fiber laser is a cladding pumped fiber comprising a rare earth doped core. The laser can include an optical feedback cavity and be coupled as a pumping source to a rare earth doped fiber amplifier, either directly or via a cascaded Raman cavity.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A cladding pumped optical fiber laser comprising:

a length of cladding pumped fiber;

a plurality of optical sources for optically pumping said cladding pumped fiber;

said optical sources optically coupled to said cladding pumped fiber by a substrate-supported planar waveguide device comprising a substrate having at least two edges and a substrate planar waveguide combiner, said substrate comprising a plurality of planar waveguides having first ends for coupling light from respective optical sources of said plurality said plurality of waveguides converging to a common waveguide, and said common waveguide tapering to a second end for coupling light to said cladding pumped fiber.

2. The laser of claim 1 wherein said cladding pumped fiber comprises a rare earth doped core and includes an optical feedback cavity.

3. The laser of claim 2 wherein said cladding pumped fiber has a first end coupled to said planar waveguide device and a second end coupled to a rare earth doped fiber amplifier for pumping said amplifier.

4. The laser of claim 1 wherein said cladding pumped fiber has a first end coupled to said planar waveguide device and a second end coupled to a rare earth doped fiber amplifier for pumping said amplifier.

5. The laser of claim 1 wherein said cladding pumped fiber has a first end coupled to said planar waveguide device and a second end coupled to a cascaded Raman cavity for pumping said cavity.

6. The laser of claim 1 wherein each said optical source comprises a linear array of plural sources and each planar waveguide comprises a linear array of co-planar first ends spaced for coupling to respective sources of a respective linear array.

7. The laser of claim 1 wherein said substrate-supported waveguide device comprises a monocrystalline silicon substrate.

8. The laser of claim 1 wherein said optical sources comprise laser diode arrays.

9. The laser of claim 1 comprising a plurality of said combiners disposed in a plurality of vertically stacked layers on said substrate with the second ends of said combiners vertically aligned for coupling light into said cladding pumped fiber.

* * * * *